United States Patent [19]
Wu

[11] Patent Number: 5,754,399
[45] Date of Patent: May 19, 1998

[54] DIRECT COUPLED CPU PACKAGE

[75] Inventor: Leon L. Wu, Hopewell Junction, N.Y.

[73] Assignee: International Business Machines Corporation, Armonk, N.Y.

[21] Appl. No.: 954,208

[22] Filed: Sep. 30, 1992

[51] Int. Cl.$^6$ ...................................... H05H 7/20
[52] U.S. Cl. .................. 361/699; 174/88 B; 361/735; 361/775; 439/259
[58] Field of Search .................. 174/68.2, 70 B, 174/71 B, 72 B, 88 B; 361/382–389, 407, 412, 413; 439/250–264, 268, 44, 74

[56] References Cited

U.S. PATENT DOCUMENTS

| | | | |
|---|---|---|---|
| 4,337,499 | 6/1982 | Cronin et al. | 361/413 |
| 4,604,677 | 8/1986 | Suzuki et al. | |
| 4,638,348 | 1/1987 | Brown et al. | |
| 4,682,207 | 7/1987 | Akasaki et al. | |
| 4,683,550 | 7/1987 | Jindrick et al. | |
| 4,730,238 | 3/1988 | Cook. | |
| 4,774,632 | 9/1988 | Neugebauer. | |
| 4,860,165 | 8/1989 | Cassinelli. | |
| 4,942,453 | 7/1990 | Ishida et al. | |
| 4,958,258 | 9/1990 | Charruan. | |
| 4,972,298 | 11/1990 | Casa et al. | |
| 5,050,037 | 9/1991 | Yamamoto et al. | 361/385 |
| 5,053,920 | 10/1991 | Staffiere | 361/407 |

FOREIGN PATENT DOCUMENTS 0300589  12/1988  Japan ......................... 439/74

OTHER PUBLICATIONS

"IBM Technical Disclosure Bulletin," vol. 32, No. 11 (Apr. 1990).

"IBM Technical Disclosure Bulletin," vol. 33, No. 1A (Jun. 1990).

*Primary Examiner*—Gregory D. Thompson
*Attorney, Agent, or Firm*—Whitham & Marhoefer

[57] ABSTRACT

An improved packaging scheme for a CPU of a main frame computer improves the performance while at the same reduces the cost of manufacture of the main frame computer. A single packaging technology is used to package the whole CPU and eliminates cable connections inside the CPU. Surface power bus technology permits the fabrication of a module with chips mounted on both front and back sides of the substrate. The surface power bus is installed on one or both sides of the module surface and derives power directly from the power cable and distributes power to chip sites directly. In a specific implementation, a uni-processor CPU with chips mounted on both surfaces of the substrate and power fed from the surface power bus results in improved processor package density and system performance. The direct coupling between the high performance processor CPU and a high cost performance ratio ceramic board not only eliminates a great portion of hardware but also reduces a significant portion of the memory path and channel path delays.

13 Claims, 23 Drawing Sheets

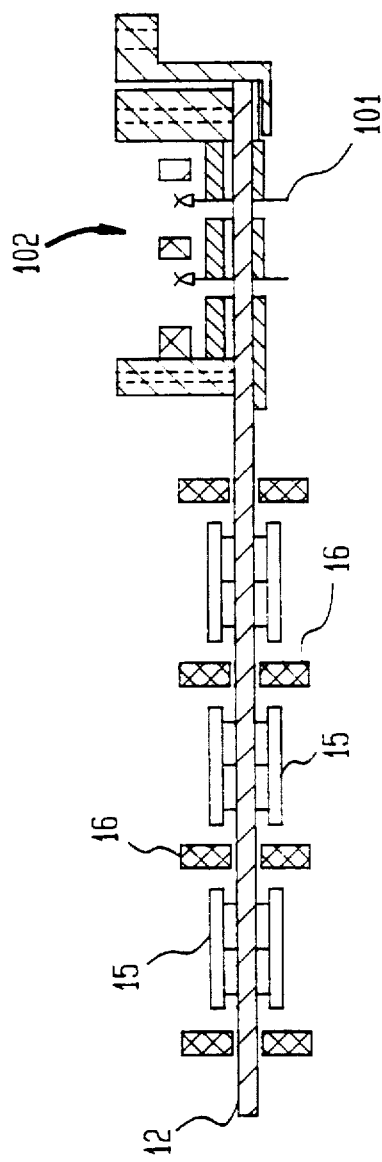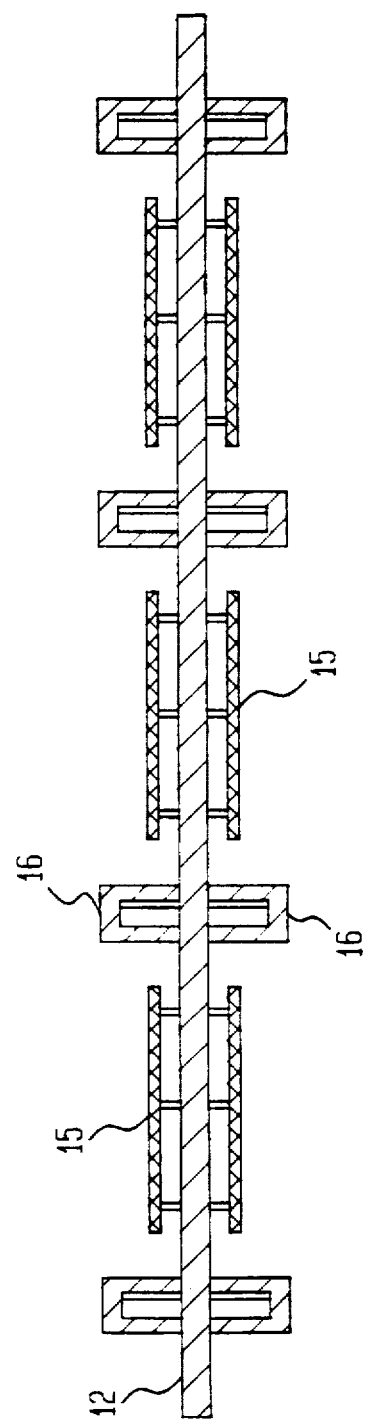

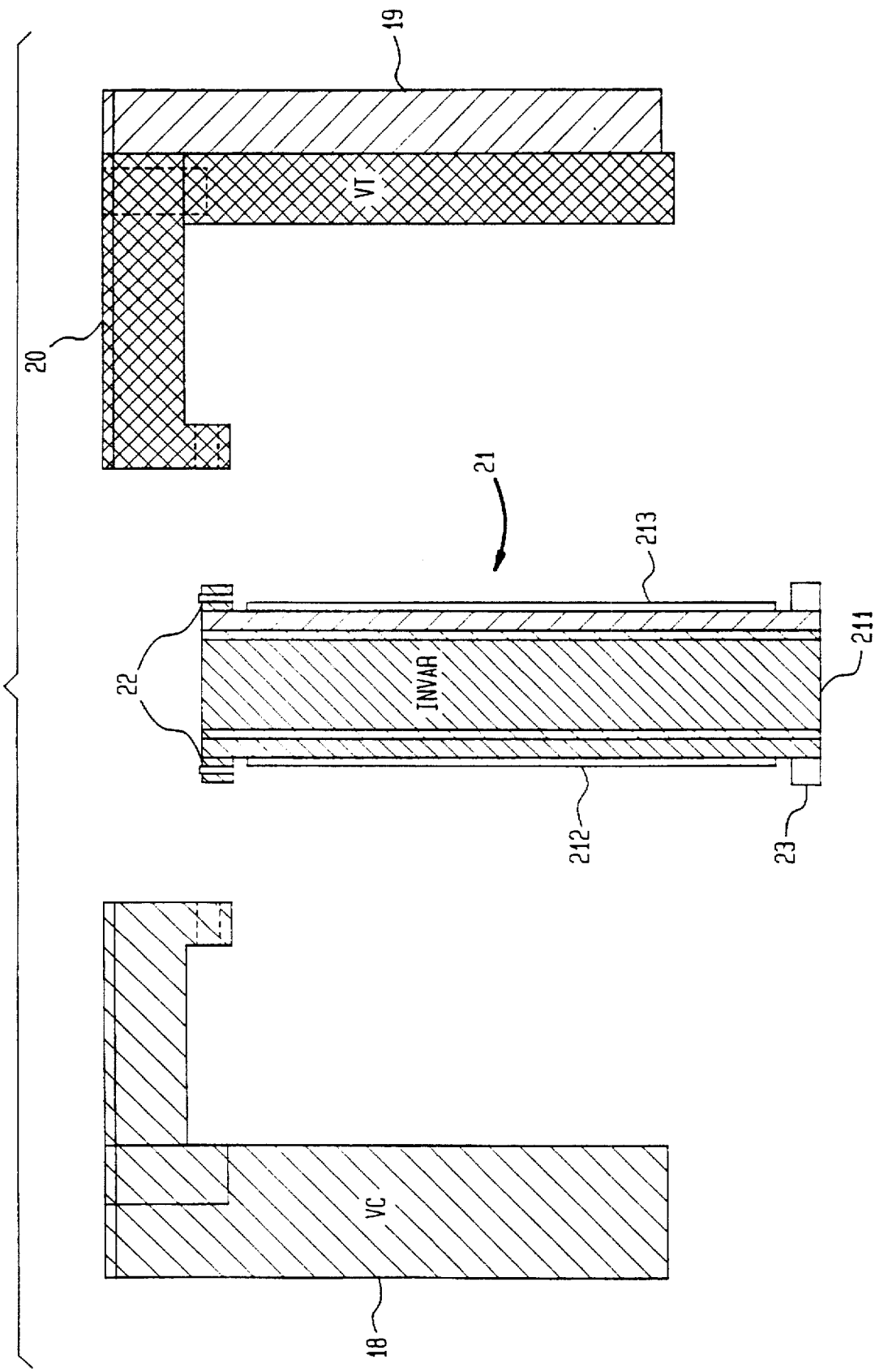

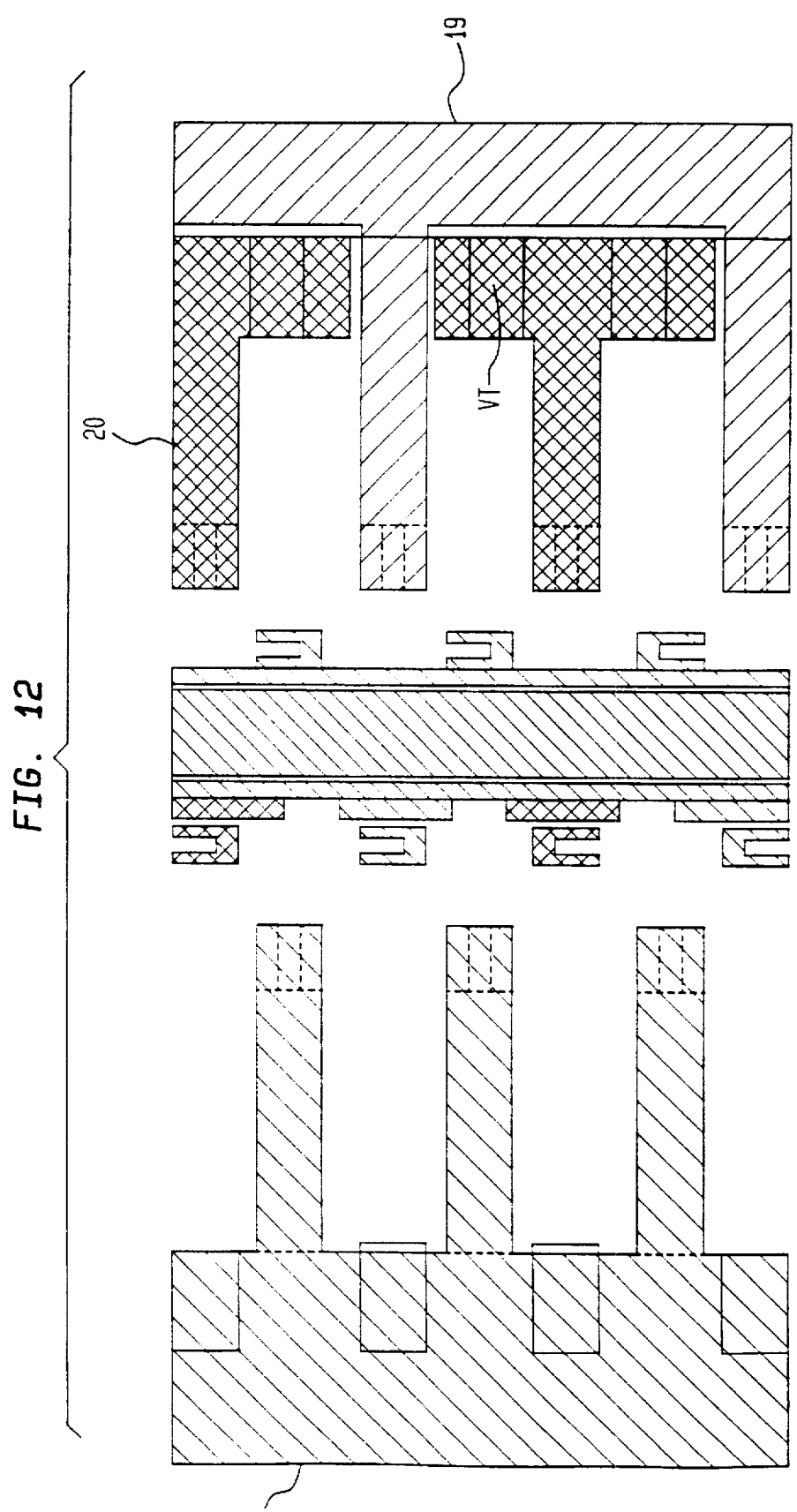

DIRECT COUPLED CPU PACKAGE

DESCRIPTION

BACKGROUND OF THE INVENTION

1. Field of the Invention

The present invention generally relates to electronic packaging and, more particularly, to a novel ceramic packaging technology to package an entire central processing unit (CPU) for a main frame computer.

2. Description of the Prior Art

As used herein, the central processor unit (CPU) packaging means the necessary packaging components which are required to service and house all important electronic components of a multi-processor unit except the power supply. Currently, three distinct packaging components related to two substantially different technologies are involved in packaging the CPU. These three packaging components are ceramic module with multi-layer ceramic (MLC) wiring and thin film wiring, printed circuit board (PCB), and cable connector. The two different technologies are MLC ceramic technology and PCB technology.

Cost performance ratio improvement is the major driving force for all technology evolution throughout computer development history. The cents/per calculation has been going down steadily. As a result, the range of main frame computer applications has increased. The customer demand for performance, measured in MIPs (millions of instructions per second), is growing approximately 30% yearly. To continue to meet the customer expectation, the price performance ratio of main frame computers must continue the downward spiral.

Roughly, the time span between two different generations of machine technology is four to five years. Historically, on the one hand, the MIP improvement factor is two to two and one half times for each machine generation. On the other hand, the machine cycle time reduction factor is two times. To reduce the cycle time by a factor of two, the packaging delay should also be reduced by a factor of two. In the past, the package delay reduction was accomplished by reducing the number of modules for one uni-processor but maintaining a similar module pitch. Historically, the silicon chip circuit has improved by a factor two times for each past machine generation. If the trend continues, this means that in order to gain the cycle time improvement objective, the current package scheme will require the processor circuit count to be reduced by a factor of two in every subsequent future machine generation. This reduction will degrade the cycle per instruction ratio which, in turn, degrades the growth of MIPs significantly in the near future and degrades the MIPs in the far future. Obviously, this approach is far from ideal.

Within the CPU, the performance leverage concentrates mainly within the uni-processor. The processor performance is related to two main factors, cycle time and cycles per instruction. It is likely that cycles per instruction will be maintained more or less constant in future machines. Therefore, the cycle time of the machine is the only factor where significant improvement may be realized. The cycle time is determined by the longest critical path delay inside the machine. In some critical paths, the path delay is dominated by the chip circuit delay. In other critical paths such as the cache path, the packaging delay is a significant factor of the total delay. To improve the cycle time of the machine, the improvement factor of the chip circuit delay as well as the package delay must be roughly equal. It is difficult to extend current packaging schemes to improve the packaging density sufficiently. Therefore, a new scheme to package the uni-processor is imperative.

The rest of the components in the CPU serves as the processor control, the memory and the input/output (I/O) control. These components have minimum performance leverage. However, the cost of packaging these components are significantly high comparable to that for the processors. Hence, the proper packaging strategy for this portion is to improve the cost to package. To improve the cost means to integrate and to combine different functions into one packaging unit.

SUMMARY OF THE INVENTION

It is therefore an object of the present invention to provide an improved packaging scheme for a CPU of a main frame computer that improves the performance while at the same reduces the cost of manufacture of the main frame computer.

To gain the necessary cost performance ratio advantage in the future, a novel packaging scheme is provided according to the invention. This scheme uses a single packaging technology, hybrid wiring MLC and thin film ceramic technology, to package the whole CPU. This scheme also eliminates cable connections inside the CPU.

Surface power bus technology permits the fabrication of a module with chips mounted on both front and back sides of the substrate. The surface power bus is installed on one side of the module surface and derives power directly from the power cable and distributes the power to the chip sites directly. As the size of the module is reduced by a factor of two from the module of a preceding generation, the module area of a double sided module will only be reduced by factor of two. With the increase by a factor of two in circuit density, the circuit count can therefore be maintained constant from generation to generation. With appropriate chip packaging improvement, the total circuit count can actually be slightly increased.

In a current design, the CPU requires the use of printed circuit boards. The basic function of these printed circuit boards in the CPU includes 1) derivation of power from the power cable and distribution of the power to the pin of the module, 2) housing the cable female connector, 3) wiring the module to the female cable connector, and 4) wiring the modules to modules on the printed circuit boards. The novel ceramic package according to the invention with its inherent high wiring density and new features absorbs all these functions. Hence, the printed circuit board can be eliminated and more circuit as well as more CPU functions can be combined into one packaging unit. Function 1 is replaced by a surface power bus. For the processor module, this replacement is required not only for reducing cost but also for improving the performance. Functions 2 and 3 are replaced by installing the female connector as well as the male connector on the processor module and installing the female connector on the system ceramic board. Function 4 is replaced by a ceramic system board which integrates the channel logic.

One of the key novel concepts of the packaging scheme according to the invention is the uni-processor CPU with chips mounted on both surfaces of the substrate and power fed from the surface power bus. This module improves the processor package density and system performance significantly. Another key novel concept of this package is direct coupling between the high performance CPU and a high cost performance ratio ceramic board. This direct coupling not only eliminates a great portion of hardware but also reduces a significant portion of the memory path and channel path delays. The memory path delay is extremely important as far as the performance of a super computer is concerned. The CPU packaging configuration obtained through combining these two concepts not only provides the optimum cost performance ratio for the CPU, but it is also consistent with the conventional upgrade strategy for a main frame machine product line.

BRIEF DESCRIPTION OF THE DRAWINGS

The foregoing and other objects, aspects and advantages will be better understood from the following detailed description of a preferred embodiment of the invention with reference to the drawings, in which:

FIG. 4 is a cross-sectional view taken along section line 3—3 in FIG. 3;

FIG. 8 is a cross-sectional view taken along section line 7—7 in FIG. 7;

FIG. 11 is a cross-sectional view like FIG. 10 but with the VC, VT and VE buses separated before assembly;

FIG. 12 is a top view like FIG. 9 but with the VC, VT and VE buses separated before assembly;

DETAILED DESCRIPTION OF A PREFERRED EMBODIMENT OF THE INVENTION

Figure 1:
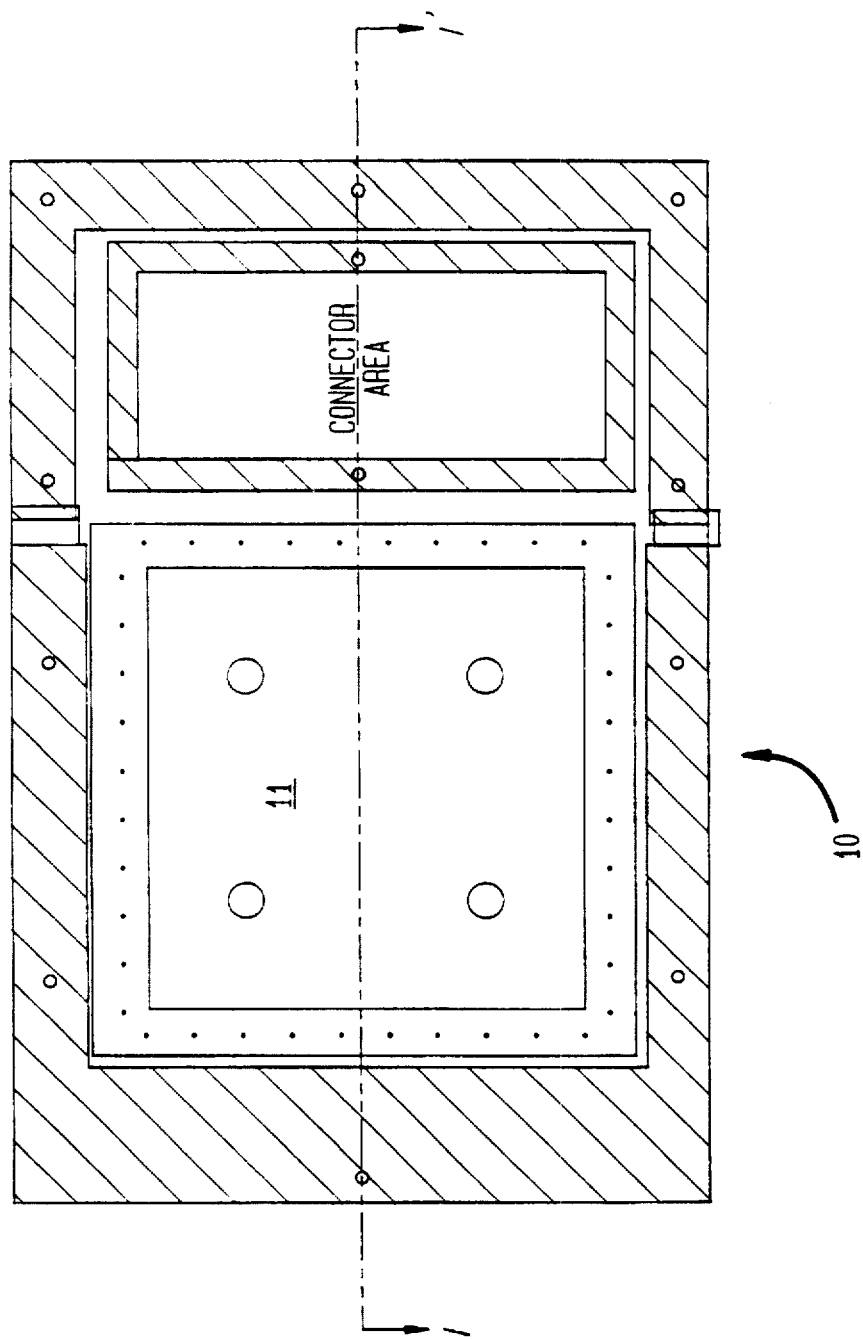
FIG. 1 is a top view of a direct coupled processor field replaceable unit (FRU) according to the invention.
Figure 2:
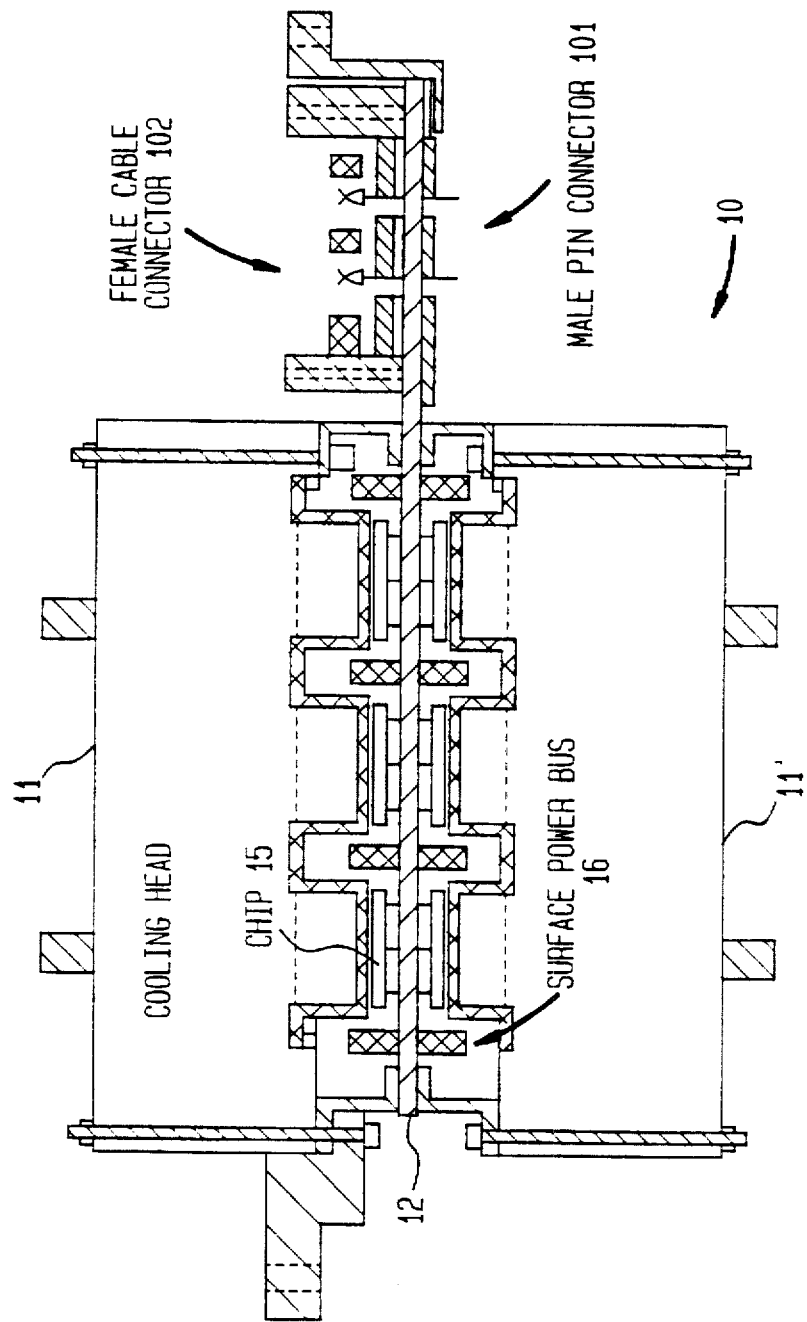
FIG. 2 is a cross-sectional view taken along section line 1—1 in FIG. 1.
Figure 3:
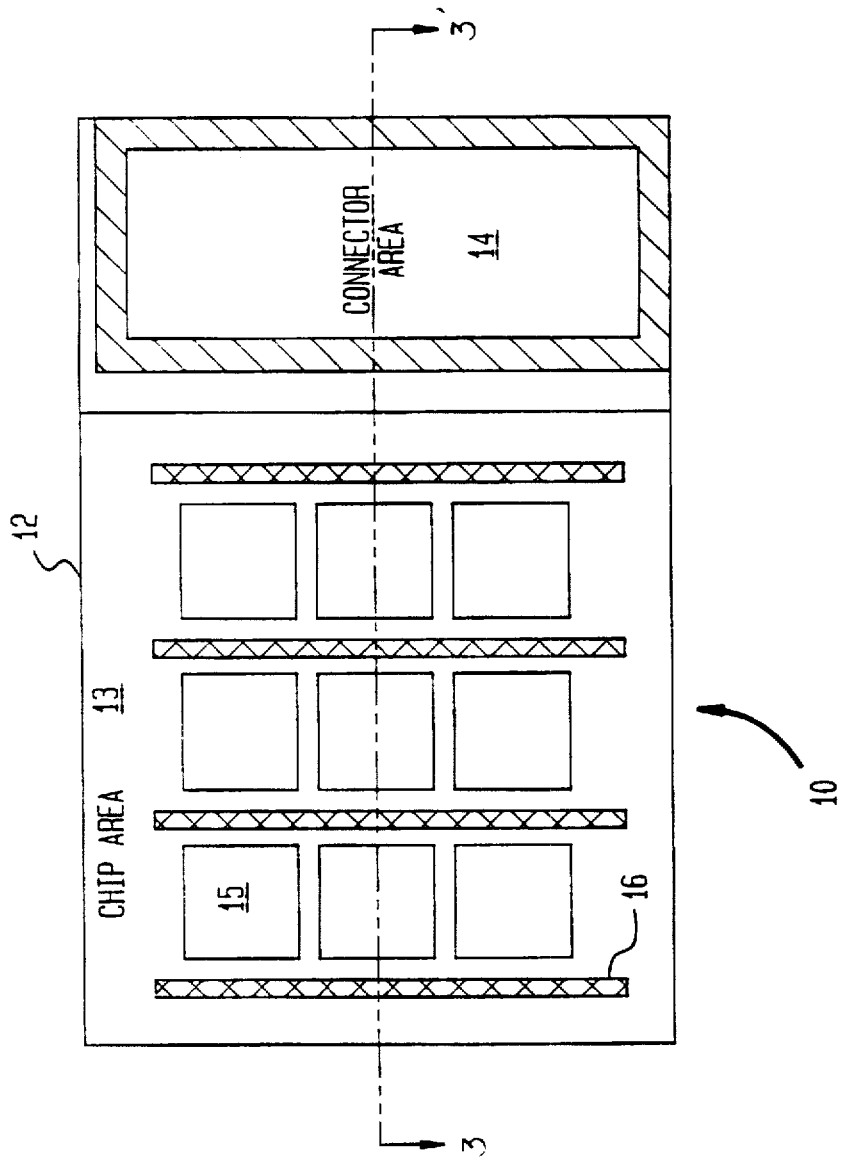
FIG. 3 is a top view of the direct coupled processor FRU shown in FIG. 1 without the cooling head.

In the preferred embodiment described, a single field replaceable unit (FRU) is used to package the uni-processor. Referring now to the drawings, and more particularly to FIGS. 1 and 3, there are shown the top views of the CPU 10 with and without the water cooling heads 11 and 11', respectively. The cross-sections at section line 1—1 and at section line 3—3 as illustrated in FIGS. 1 and 3 are shown in FIGS. 2 and 4, respectively. The substrate 12 (FIGS. 2 and 4) of the CPU 10 is ceramic. As best shown in the FIG. 3, the substrate can be divided into two portions, the chip area 13 and the connector area 14.

Figure 5:
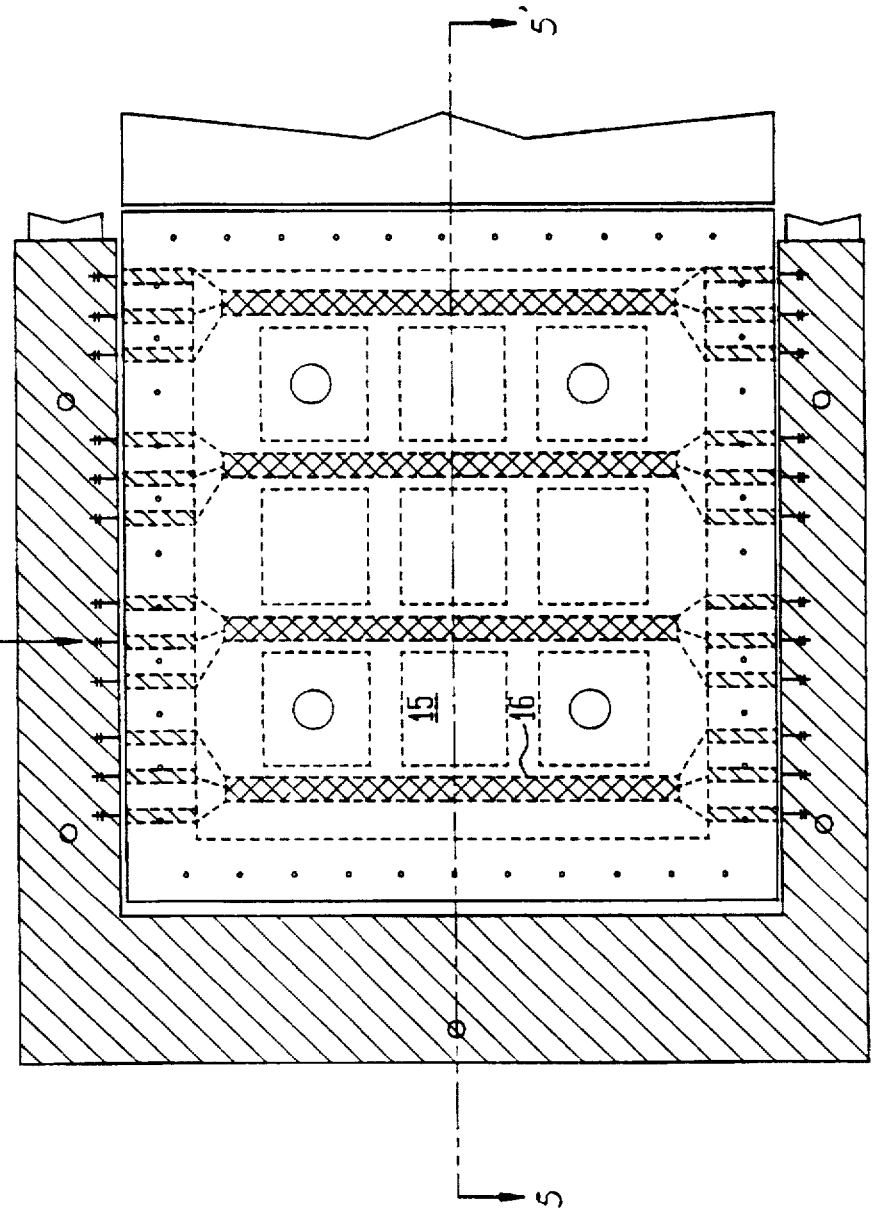
FIG. 5 is an enlarged see through view of a chip area in FIG. 1 showing in more detail the power cable connection for the surface power bus.
Figure 6:
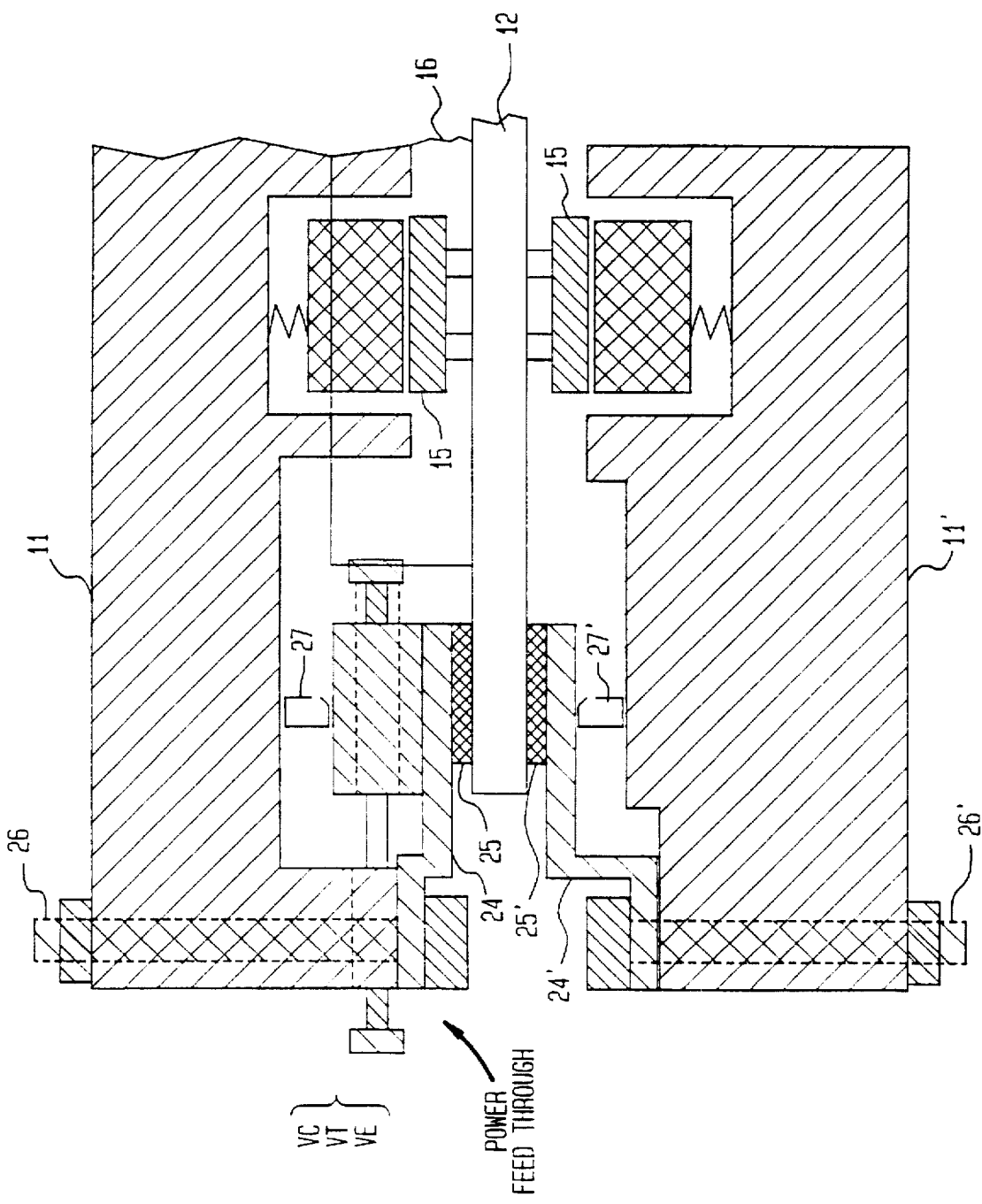
FIG. 6 is an enlarged cross-sectional view taken along section line 5—5 in FIG. 5.
Figure 7:
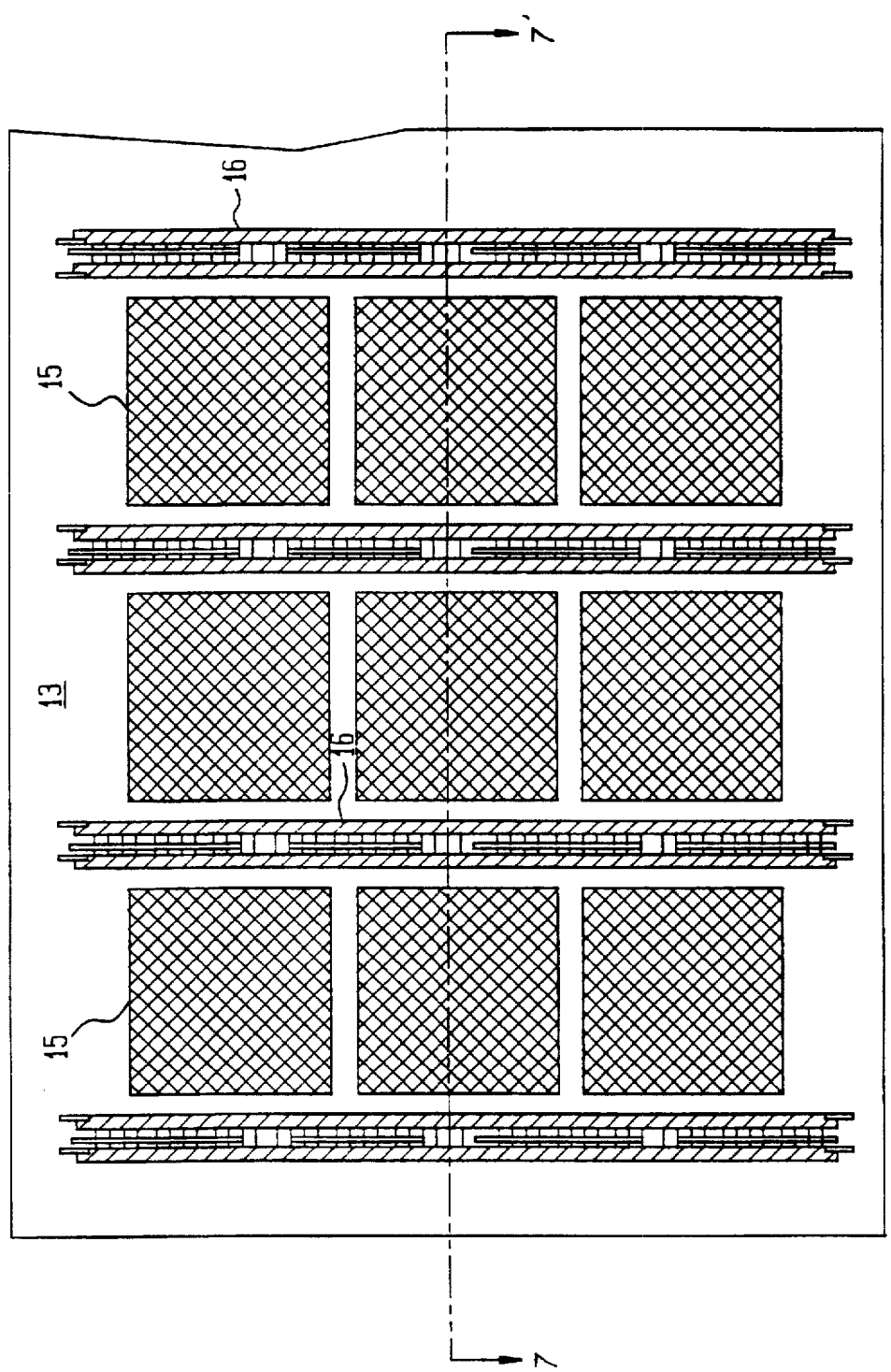
FIG. 7 is a top view of the ceramic substrate chip area in FIG. 5.

In the chip area 13, one portion of the substrate 12 is used to mount chips 15 on both the front side and the back side surfaces of this substrate. Magnified top views of this portion with and without the cooling head 11 are shown in FIGS. 5 and 7, respectively. The cross-sections at section line 5—5 and at section line 7—7 as illustrated in FIGS. 5 and 7 are shown in FIGS. 6 and 8, respectively. The chip signal I/Os are inter-connected together with wiring. A surface power bus 16 is used to distribute power uniformly along two opposite edges of the chip sites. The power planes in the ceramic substrate then feed the power to the interior of the chip packages. As shown in FIG. 7, the surface power bus 16 runs from one edge of the module to the opposite edge. The power is brought to the module with the power cable (not shown) and connected at connection point 17 shown in FIG. 5. The power is fed into the module via power feed throughs from two sides of the module cooling head assembly, as shown in FIG. 6.

Figure 10:
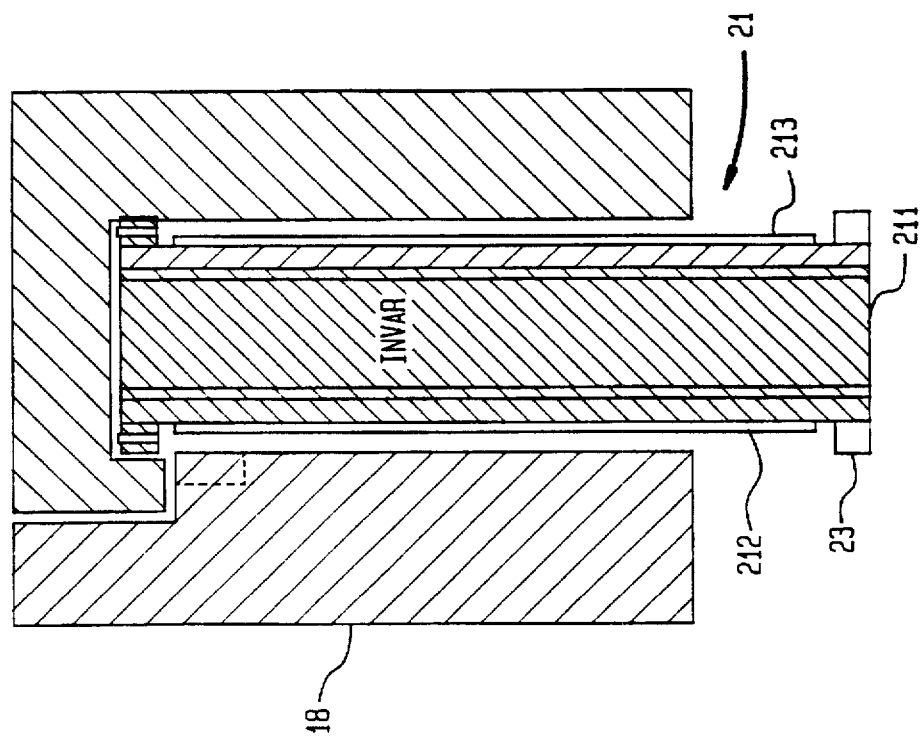
FIG. 10 is a cross-sectional view taken along section line 9—9 in FIG. 9.
Figure 9:
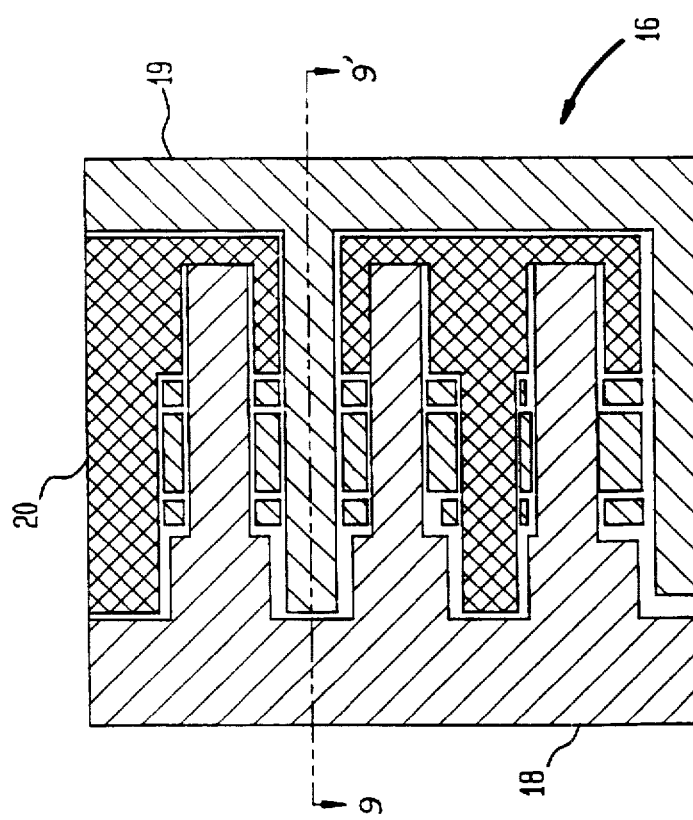
FIG. 9 is a partial top view of the surface power bus comprising the VC, VT and VE buses after assembly.

Enlarged views of a section of the surface power bus 16 as indicated in FIG. 7 are shown in FIGS. 9 and 10. FIG. 10 being a cross-section taken along line 9—9 in FIG. 9. The surface power bus is composed of VC bus 18, VT bus 19, and VE bus 20. In FIG. 9, the power bus is shown as installed on the module surface. FIGS. 11 and 12, corresponding to FIGS. 9 and 10, show the bus disassembled to better illustrate its construction. There are two basic elements in the power bus. One element is the horizontal (to the plane of the module) power feed composed of the VC bus 18, VT bus 19, and VE bus 20. This element is used to feed power horizontally from the module power structure located at the periphery of the module, as shown in FIG. 6, to the chip sites. The other element is the vertical power feed 21 composed of a central invar post 211 and insulated copper faces 212 and 213. This vertical power feed element is used to re-direct current coming from the horizontal power bus into the module surface.

The power feed to both ends of the horizontal power bus is by means of copper cable (not shown). The current is uniformly distributed into the modules along two sides of the chips, as shown in FIGS. 5 and 7. Because of the very high current required for a high performance CPU module, the power feed is made of pure copper to save space on the module surface. The horizontal power feed is soldered to the vertical power feed element 21 with low temperature solder through several flexible copper C-clips 22. The main purpose of the C-clips is to absorb the mismatch of temperature expansion between the vertical power feed (copper-invar-copper) and the horizontal power feed (pure copper) after the low temperature soldering cycle for mounting and the on and off thermal cycling when the machine is used. The mismatch is absorbed through the distortion of the flexible C-clips 22.

The vertical power feed element 21 is fabricated with copper-invar-copper to match the thermal expansion coefficient of the ceramic material. The main purpose of the copper-invar-cooper element is as a support for the horizontal power feed and to direct the current vertically into the module. The current from the vertical power feed flows from copper face 212 into a via (not shown), through a mesh plane (also not shown) in the module and through another via (not shown) and into the chip. From the chip, current flows through a via (not shown), through a mesh plane (also not shown) and through another via to the copper face 213. The connections using vias and mesh planes are all conventional and therefore not shown. The vertical power feed element 21 is joined to the module surface with a lead tin alloy 23.

As shown in FIG. 6, flanges 24 and 24' surrounding the chips are soldered on the perimeter of the ceramic substrate surface, generally as indicated at 25 and 25', respectively. Two cooling heads 11 and 11', one for each side, are attached to the flange with screws, generally indicated at 26 and 26'. The cooling heads are also used for sealing. Collapsible Invar C-rings 27 and 27' are placed inside the joint between cooling head and the flange as shown to insure the chip is completely isolated from the ambient.

Figure 16:
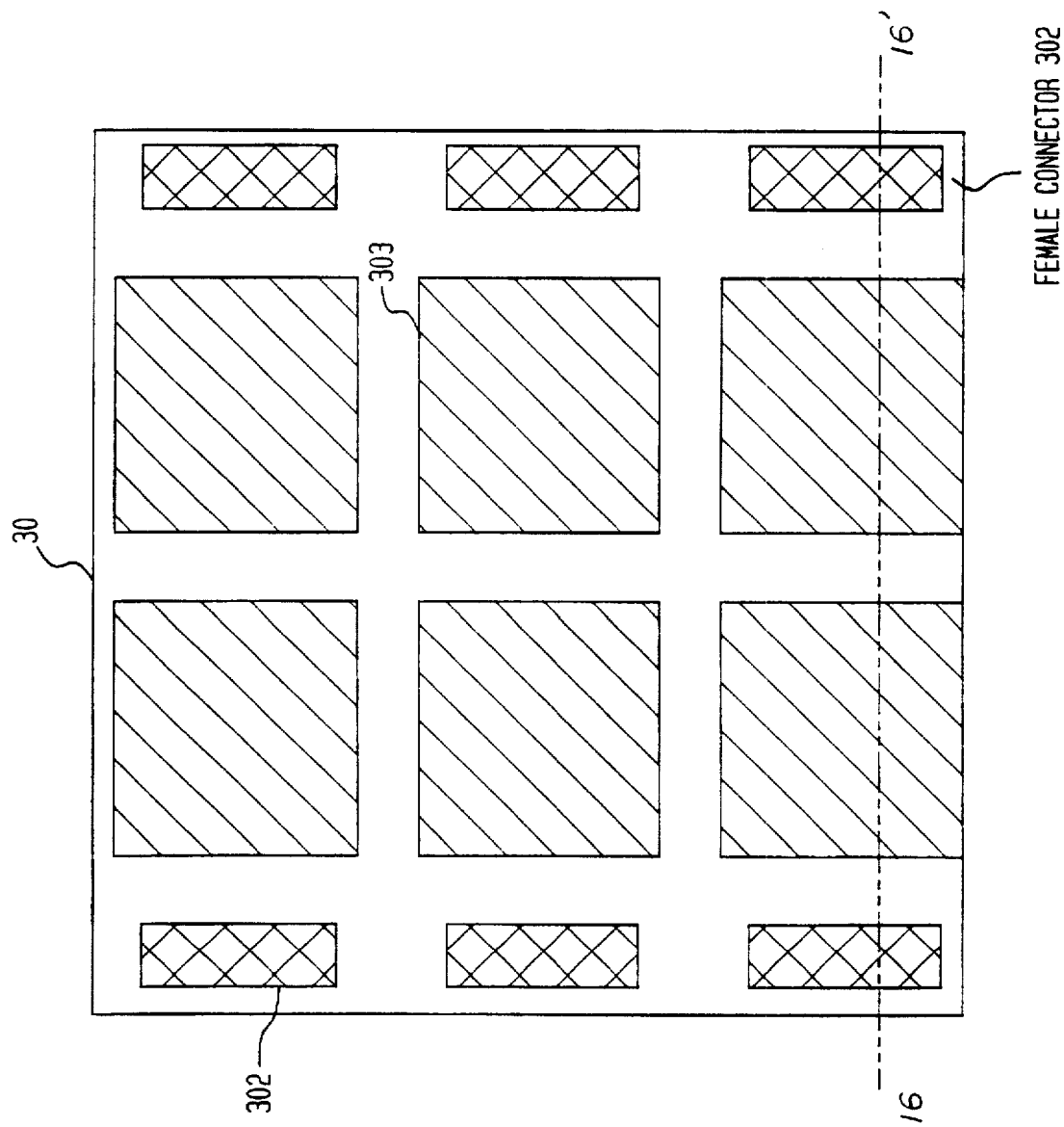
FIG. 16 is a top view of the central part of a 4-way uni-processor assembly.

In the connector area 14 of the substrate shown in FIG. 2, two zero shear stress connectors are mounted both on front and back surfaces of the substrate 12. A male connector 101 is mounted on one side, and a female connecter 102 is mounted on the other side. The male connector 101 is directly plugged into a female connector installed on the ceramic system board, such as shown in FIG. 16. The female connector 102 receives two male cable connectors from different CPU packages.

Figure 13:
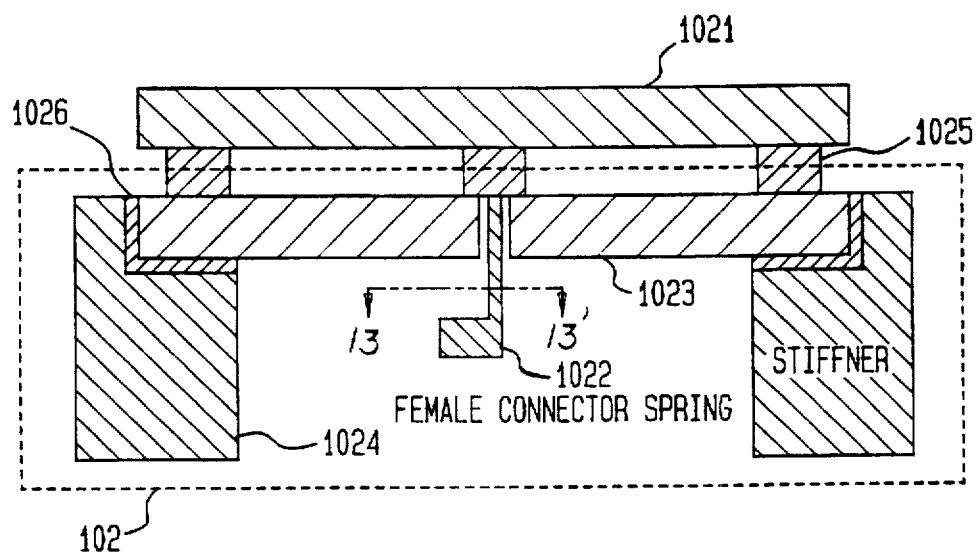
FIG. 13 is a cross-sectional view of a zero shear stress female connector according to the invention.
Figure 13A:
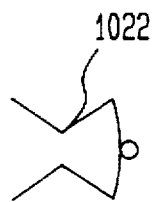
FIG. 13A shows a cross-section of the female connector spring taken along section line 13—13 in FIG. 13.

FIG. 13 is a cross-sectional view of the female connector 102. The female connector, shown within the dotted line, is attached to a ceramic body 1021 having either thin film or MLC wiring. The ceramic body 1021 can be either a module or a ceramic board. The connector itself comprises the female connector spring 1022, a metallized ceramic 1023 and a stiffener 1024. The female connector spring has a cross-section shown in FIG. 13A taken at section line 13—13 in FIG. 13. The metallized ceramic 1023 is preferred to be formed by casting to minimize cost. The holes (only one of which is shown) inside the ceramic 1023 are tinned. The thickness of the ceramic 1023 should be sufficient to support the female connector spring 1022. The spring 1022 is inserted and soldered in the tinned hole. After soldering of the spring 1022, the metallized ceramic 1023 is soldered at 1025 to the ceramic wiring body 1021. There are only three solder joints 1025 shown for simplicity of illustration. The center solder joint is the electrical connection between the connector 1022 and the ceramic wiring body 1021, while the other solder joints are used for mechanical support. The stiffener 1024 is attached to the metallized ceramic 1023 with solder or re-workable adhesive 1026. The stiffener is used to move the metallized ceramic during connector mating and is also used to support the metallic flange of the male connector as the two connectors are engaged, as described below.

Figure 14:
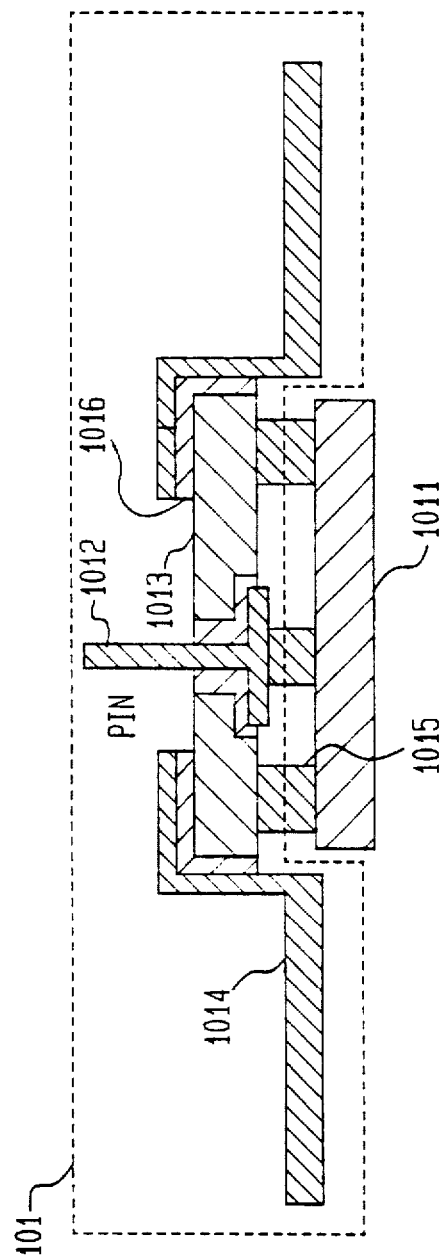
FIG. 14 is a cross-sectional view of a zero shear stress male connector according to the invention.

The male connector is shown in cross-section in FIG. 14. The male connector, shown within the dotted line, is attached to a ceramic body 1011 having either thin film or MLC wiring. Like the ceramic body 1021, the ceramic body 1011 can be either a module or a ceramic board. The connector itself comprises the male connector pin 1012, a metallized ceramic 1013 and a metal flange 1014. The thickness of the ceramic 1013 should be sufficient to support the pin 1012 and has a hole which is tinned. The pin 1012 is inserted into the tinned hole and soldered. After soldering, the metallized ceramic 1013 is soldered at 1015 to the ceramic wiring body 1011. Again, there are only three solder joints 1015 shown for simplicity of illustration, the center solder joint being the electrical connection between the connector 1012 and the ceramic wiring body 1011, while the other solder joints are used for mechanical support. The metal flange 1014 is attached to the metallized ceramic 1013 with solder or re-workable adhesive 1016.

Figure 15A:
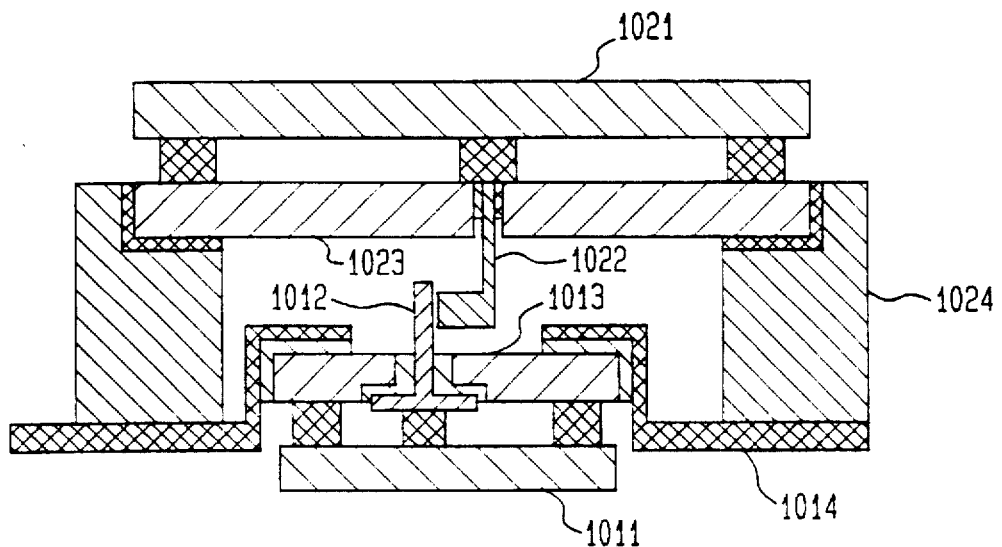
FIGS. 15A and 15B are cross-sectional views showing the process of connecting the connectors shown in FIGS. 13 and 14.

The first step in engaging the connectors is to insert the male connector 101 to the female connector as shown in FIG. 15A. The male connector is inserted in such a way that after insertion, the pin 1012 is located next to the opening of the spring 1022. Because there is no actual contact between the pin 1012 and the spring 1022, this stage is referred to as zero force insertion. Also, after insertion, the metallic flange 1014 of the male connector is resting on the stiffener 1024 of the female connector. In practice, the stiffener 1024 is attached to a strong and stable frame (not shown). Therefore, there is no force exerted on the wiring ceramic bodies 1011 and 1021 except for their own weight.

Figure 15B:
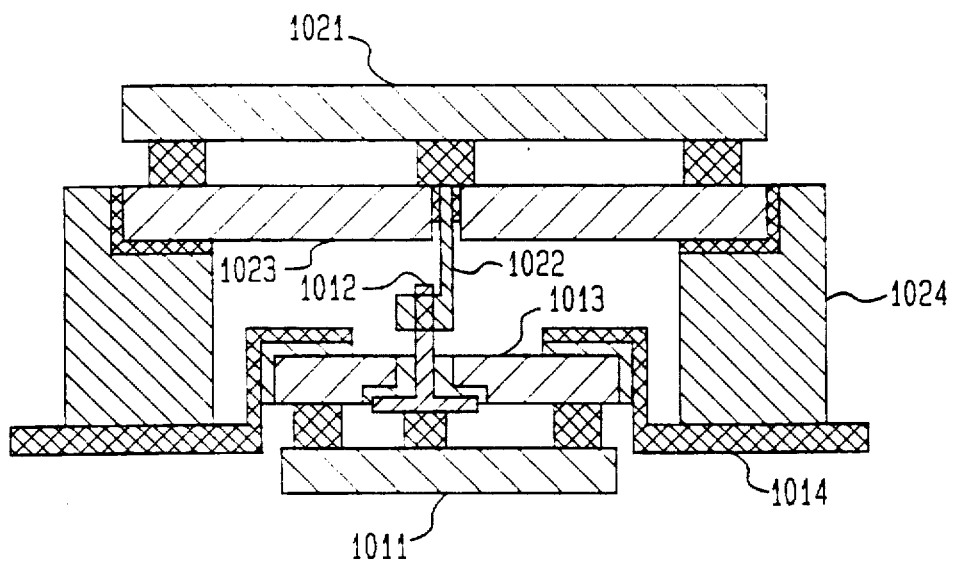

The second stage of the connectors engaging is to slide the pin 1012 into the female spring 1022 as shown in FIG. 15B. This is accomplished by applying force to move the flange 1014 to the right (as shown in the drawing) relative to the stiffener 1024. This movement slides the pin 1012 into the spring 1022. As the pin 1012 enters the spring opening, the friction between the surface of the pin and the surface of the spring produces a force on the pin 1012. The reaction of this force produces another force on the spring 1022. The forces on the pin or spring will in turn transmit to their respective solder joints inside the holes of their respective metallized ceramics 1011 and 1021. These forces are both compressive and expansive components, depending on the side of the hole surface. A solder joint can stand much higher compressive or expansive stress than shear stress.

Figure 17:
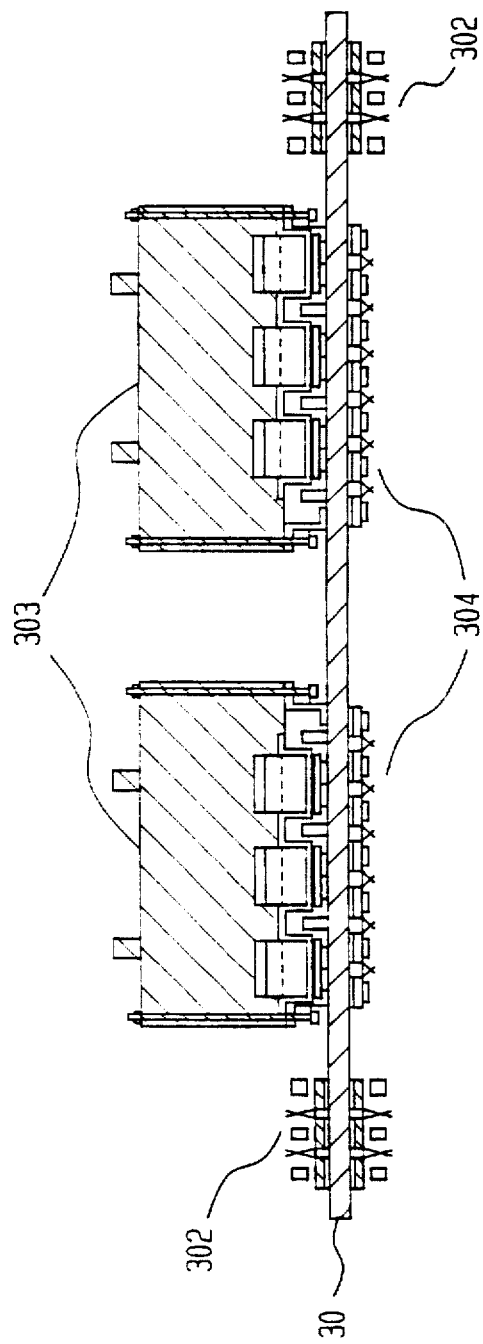
FIG. 17 is a cross-sectional view taken along section line 16—16 in FIG. 16.

FIGS. 16 and 17 respectively show plan and cross-sectional views of the system board 30. The main function of the system board 30 is to package all circuits except those of the processor. That means it includes the circuit modules 303 of the system control unit, the I/O channel control unit, the memory and the CMOS channel logic and drivers. A sufficient number of female connectors 302 are also installed on the system board so that the male connectors 101 of the processors and the cable from the processor of another cluster can be connected.

Figure 18:
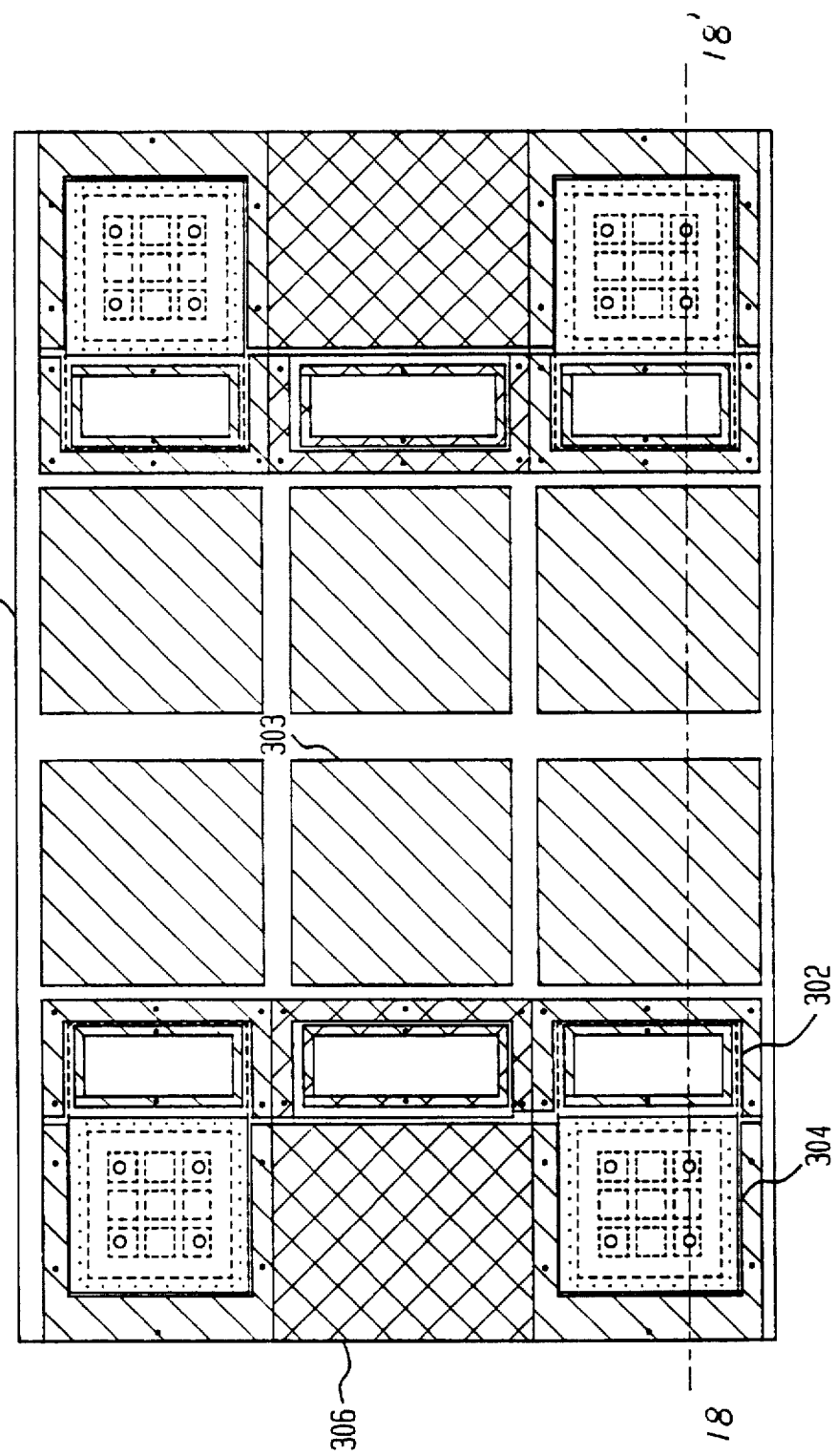
FIG. 18 is a top view of a 4-way uni-processor assembly.
Figure 19:
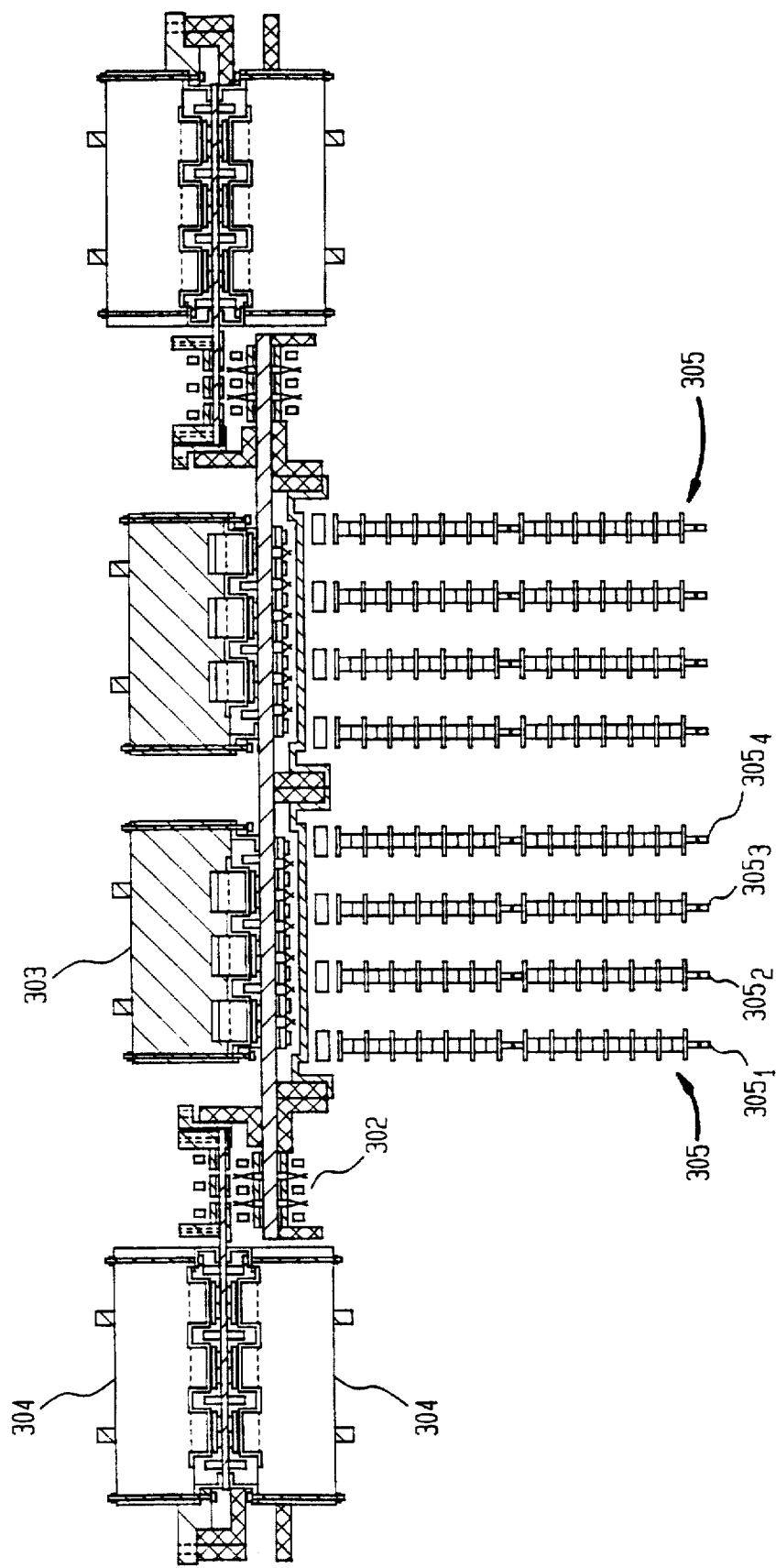
FIG. 19 is a cross-sectional view taken along section line 18—18 in FIG. 18.

The MLC ceramic substrate is used as the main wiring body. The size of the substrate depends upon the number of components to be housed inside the system board. For a main frame computer, a 4-way CPU system board is a 300 mm substrate. In this 300 mm ceramic board, there are six flange sealed modules 303 in two rows on the center portion of the substrate top surface. On the bottom surface of system board opposite to the flange sealed modules, six female connectors 304 (FIG. 17) are installed. Six ceramic card packages 305 (FIG. 19) are plugged into these six female connectors. Each of these packages contains four double sided mount air cooled ceramic cards $305_1$ to $305_4$. The chips on these ceramic cards include CMOS DRAM for two gigabytes and logic for the channel. On the top surface of the substrate, two rows of connectors 302 are installed. One is located to the left of the modules 303. Another one is located to the right of the modules 303. On the bottom side opposite to those on the front side of the substrate surface, two identical rows of female connectors 302 (FIG. 17) are also installed. Each row of female connectors has three identical connector groups. Each female connector group has 500 signal connections. The center connector groups in these four rows are reserved for fiber optic ceramic cards. The other four connector groups on the top surface are reserved for the male connectors of the four uni-processor FRUs 304, each FRU 304 being a CPU package as shown in FIGS. 1 and 2. This is best shown in FIG. 18. Four identical groups on the bottom surface are reserved for the male cable connectors from the uni-processors of different CPUs.

Figure 20:
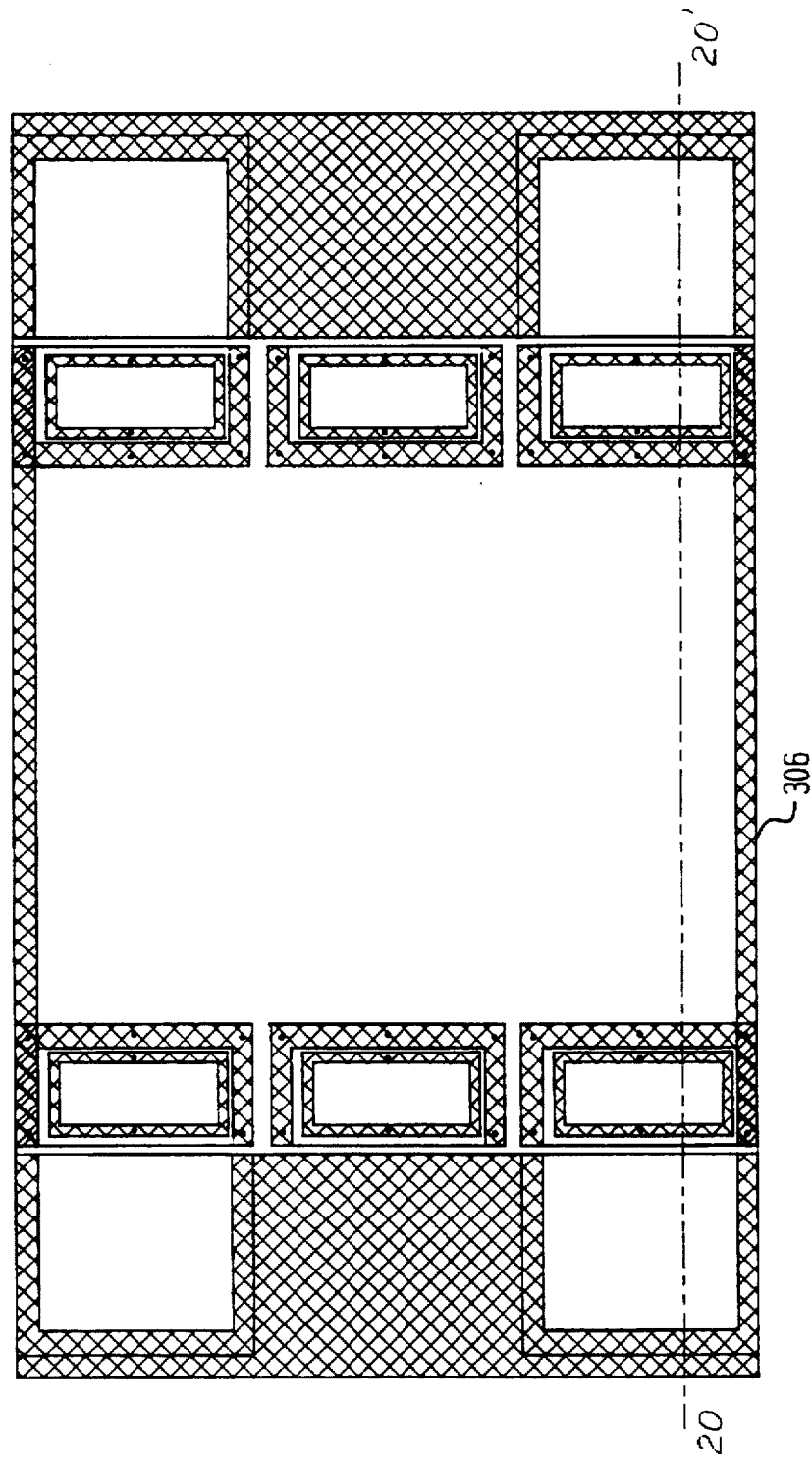
FIG. 20 is a top view of the front stiffener for the 4-way uni-processor system shown in FIG. 18.
Figure 21:
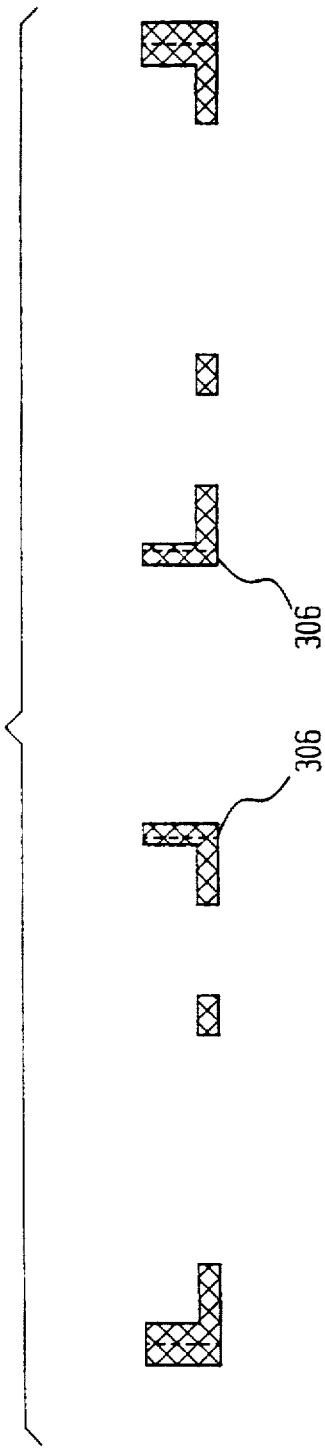
FIG. 21 is a cross-sectional view taken along section line 20—20 in FIG. 20.
Figure 22:
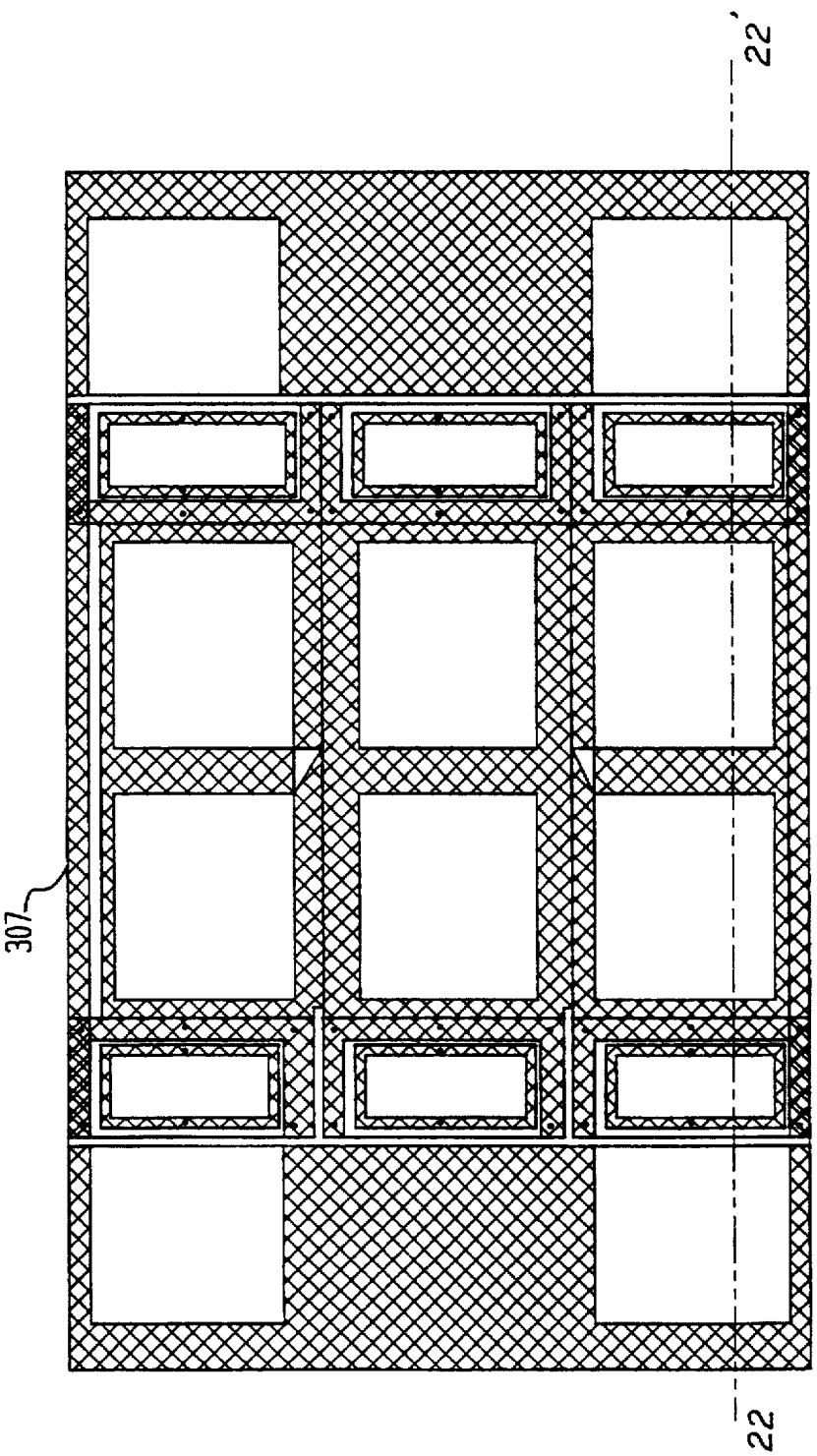
FIG. 22 is a bottom view of the back stiffener for the 4-way uni-processor system shown in FIG. 18.
Figure 23:
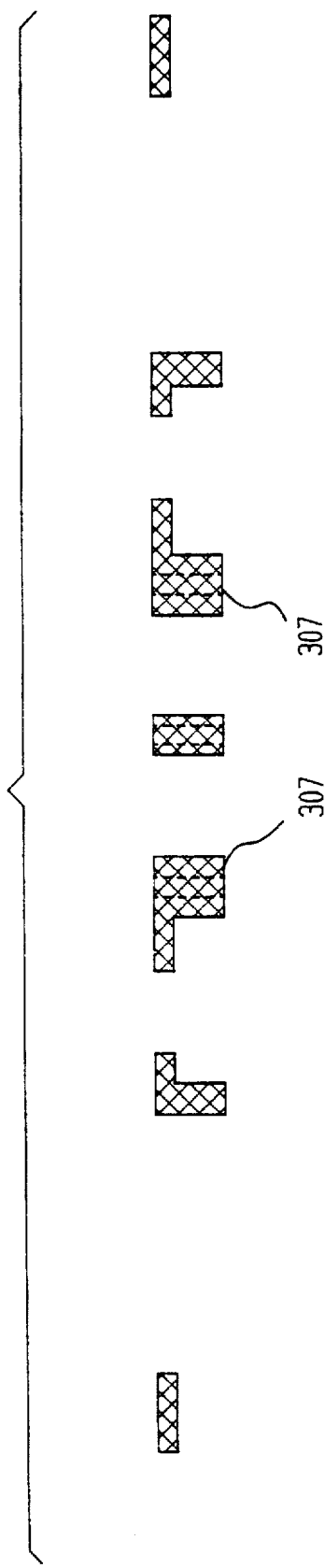
FIG. 23 is a cross-sectional view taken along section line 22—22 in FIG. 22.
Figure 24:
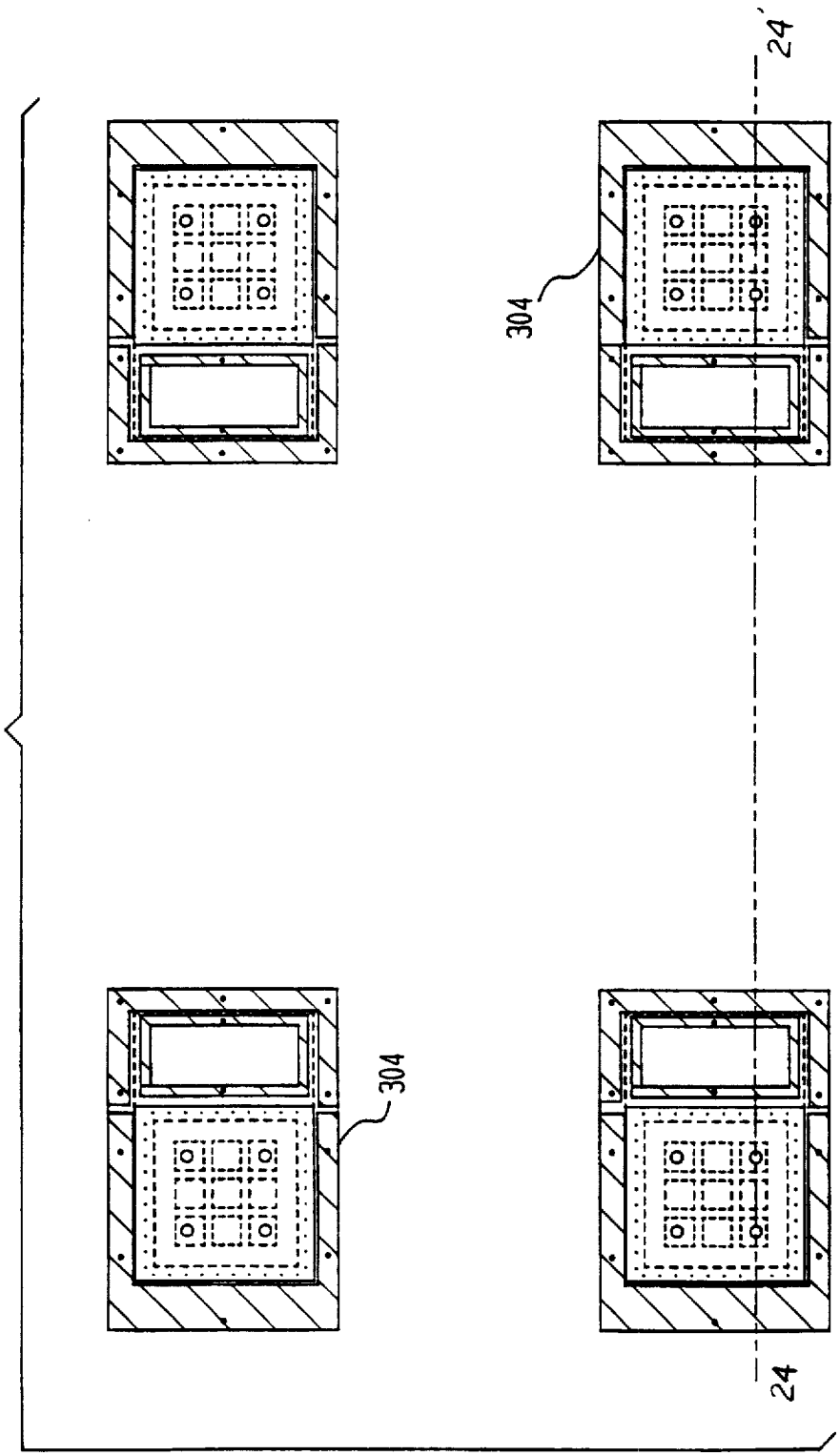
FIG. 24 is a top view/of the 4-way uni-processors of the system shown in FIG. 18.
Figure 25:
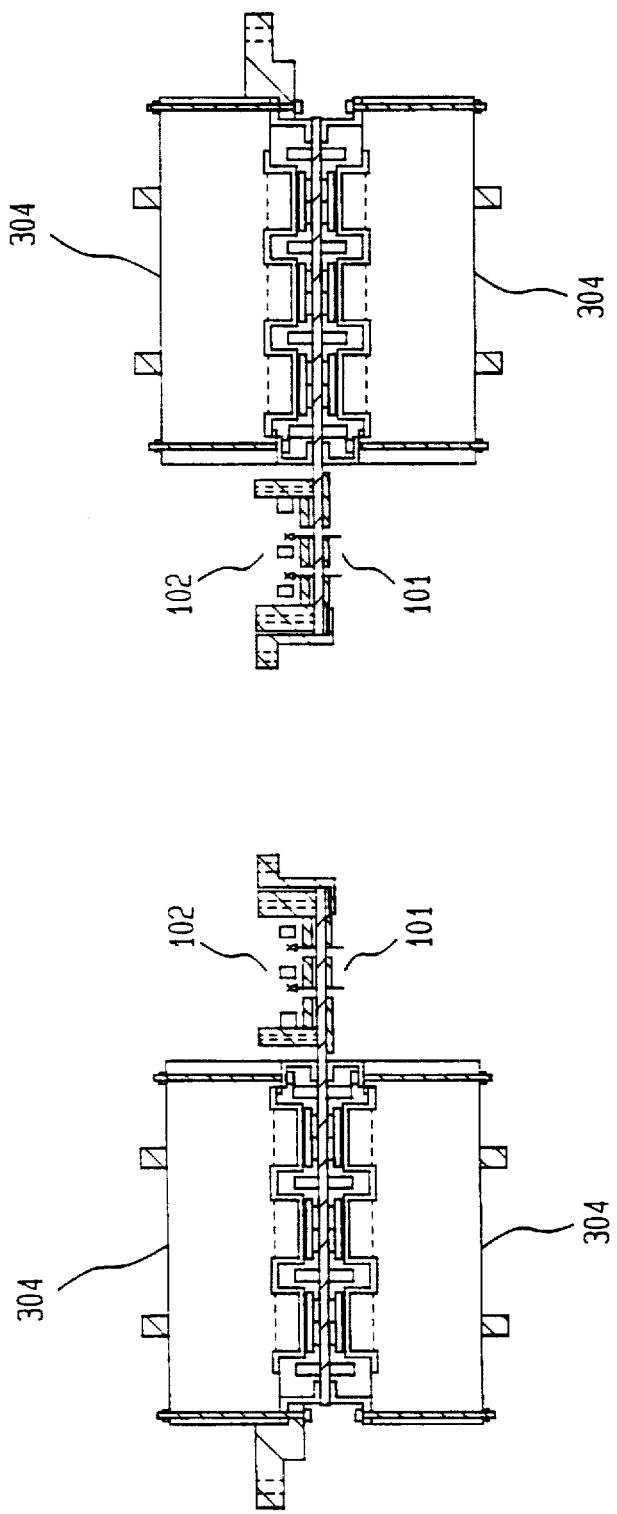
FIG. 25 is a cross-sectional view taken along section line 24—24 in FIG. 24.

In addition, two stiffeners are also mounted on the front and bottom surface of the substrate, respectively. A top view and the cross-sectional view of a 4-way processor, except the fiber optic channel card, are respectively shown in FIGS. 18 and 19. The top and cross-sectional views for the front side stiffener 306 are shown in FIG. 20 and 21, respectively. Those for the back side stiffener 307 are shown in FIGS. 22 and 23, respectively. FIGS. 24 and 25 respectively show the top and cross-sectional views of the CPU only for the 4-way system shown in FIG. 18.

The stiffeners 306 and 307 are used to carry mechanical load of all the hardware on the system board 30 and the system board itself. Therefore, ideally, there is no mechanical load on the ceramic board. The stiffeners are also used as a platform to install all hardware to guide the proper mating of the male connector to the female connector. Aluminum can be used for the stiffeners. The stiffeners are attached to the ceramic substrate with either re-workable glue or solder. The perimeters of the stiffeners are attached to the mechanical frame (not shown) at many points (at least four for each). At each point, two sets of connections are provided. One set of connections allow the stiffener to move freely on its own plane. Another one is to rigidly attach to the frame, once it is engaged. The former set can be a ball bearing support. The latter can be a set of screws and nuts. These two sets of connection allow one stiffener to attach rigidly to the frame while another one is free to slide on its own plane. Such condition eliminates any shearing stress on the critical signal pin during the connector engaging period. For example, when the processor is plugged to the board, the front stiffener will be attached to the mechanical frame rigidly. But the back stiffener is allowed to slide freely. The condition is reversed when the ceramic card package is plugged to the system board.

The direct coupled CPU package just described is used for a high performance water cooled bipolar circuit machine. However, it can also be used to accommodate an air cooled cost performance CMOS machine. The simplifications include the following. First, all water cooling heads are changed to air cooling heads. Second, the power requirement for the power bus is drastically reduced. The power bus is eliminated or restricted to the outside of the chip area. Third, the female spring for the female connector is removed. The pin of the male connector is soldered to the hole reserved for the female spring. Fourth, the front and back stiffener is replaced by a much simpler stiffener, since the connector pin is fixed by soldering.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A replaceable central processor module package comprising:

a ceramic substrate having first and second sides, each of said first and second sides having a chip area and a connector area in registry;

integrated circuit chip sites mounted in rows within the chip areas on said first and second sides of said ceramic substrate;

surface power bus means extending from one edge of said ceramic substrate to an opposite edge of said ceramic substrate and on at least one of said first and second sides thereof, said surface power bus means running between said rows of integrated circuit chip sites for uniformly distributing power to said integrated circuit chip sites, said surface power bus means comprises adjacent each row of chip sites a horizontal member comprising at least two voltage buses and a vertical member, said vertical member supporting said horizontal member above said ceramic substrate and conducting paths for current between said voltage buses and said integrated circuit chip sites;

zero shear stress male connector on said first side of said ceramic substrate in said connector area, said zero shear stress male connector adapted to mate with a zero shear stress female connector on a system board to which said replaceable central processor module package is adapted to be attached; and zero shear stress female connector on said second side of said ceramic substrate in said connector area, said zero shear stress female connector adapted to mate with a zero stress male connector on a cable.

2. The replaceable central processor module package recited in claim 1 wherein said horizontal member is composed of copper and said vertical member is made of copper-invar-copper, said vertical member being soldered to said substrate and providing a thermal match to said substrate, said surface power bus means further comprising deformable C-clips attaching said horizontal member to said vertical member, said deformable C-clips deforming to absorb thermal stress between said horizontal and vertical members.

3. A replaceable central processor module package comprising:

a ceramic substrate having first and second sides, each of said first and second sides having a chip area and a connector area in registry;

integrated circuit chip sites mounted in rows within the chip areas on said first and second sides of said ceramic substrate;

surface power bus means extending from one edge of said ceramic substrate to an opposite edge of said ceramic substrate and on at least one of said first and second sides thereof, said surface power bus means running between said rows of integrated circuit chip sites for uniformly distributing power to said integrated circuit chip sites;

zero shear stress male connector on said first side of said ceramic substrate in said connector area, said zero shear stress male connector adapted to mate with a zero shear stress female connector on a system board to which said replaceable central processor module package is adapted to be attached, said zero shear stress male connector comprises a metallized ceramic having at least one hole extending from a first surface to an opposite second surface of said metallized ceramic and through which a male connector pin projects extending beyond said first surface and being approximately flush with said second surface, said male connector pin being soldered within said hole, and a metal flange surrounding and attached to said metallized ceramic; and zero shear stress female connector on said second side of said ceramic substrate in said connector area, said zero shear stress female connector adapted to mate with a zero stress male connector on a cable.

4. The replaceable central processor module package recited in claim 3 further comprising means for attaching said zero shear stress male connector to said substrate at said second surface of said metallized ceramic, said means including soldering said connector pin to wiring on said substrate.

5. The replaceable central processor module package recited in claim 3 wherein said zero stress female connectors comprise a second metallized ceramic having at least one hole extending from a first surface to an opposite second surface of said second metallized ceramic and through which a female connector spring projects extending beyond said first surface and being approximately flush with said second surface, said female connector pin being soldered within said hole, and a stiffener surrounding and attached to said second metallized ceramic, said stiffener supporting said metal flange of said zero shear stress male connector when said male connector is inserted with zero insertion force, said zero shear stress male connector pin being inserted into said female connector spring by sliding said metal flange on said stiffener.

6. The replaceable central processor module package recited in claim 5 further comprising means for attaching said zero shear stress female connector to said substrate at said second surface of said second metallized ceramic, said means including soldering said female connector spring to wiring on said substrate.

7. A multi-way central processing unit comprising:

plural replaceable central processing unit modules and a system board having first and second sides each having a central area, each replaceable central processing unit module comprising:

a ceramic substrate having first and second sides, each of said first and second sides having a chip area and a connector area in registry, integrated circuit chip sites in rows within the chip areas on said first and second sides of said ceramic substrate, surface power bus means extending from one edge of said ceramic substrate to an opposite edge of said ceramic substrate and on at least one of said first and second sides thereof, said surface power bus means running between said rows of integrated circuit chip sites for uniformly distributing power to said integrated circuit chip sites, zero shear stress male connector on said first side of said ceramic substrate in said connector area said zero shear stress male connector adapted to mate with a zero stress female connector on a system board to which said replaceable central processing unit module is attached, and zero shear stress female connector on said second side of said ceramic substrate in said connector area, said zero shear stress female connector adapted to mate with a zero stress male connector on a cable, said system board having a first plurality of female zero shear stress connectors in rows on either side of said central area of said first and second sides, said zero shear stress male connectors of said replaceable central processing modules being inserted in at least some of said first plurality of female zero shear stress connectors on at least said first side of said system board; and front and back stiffeners, said front stiffener being mounted to said first side of said system board and providing means for mounting said multi-way central processing unit, and said back stiffener being mounted to said second side of said system board and floating with respect to said front stiffener, said front and back stiffeners providing mechanical rigidity to said system board.

8. The multi-way central processing unit recited in claim 7 further comprising:

a plurality of logic chip sites on the first side of said system board within said central area, a second plurality of female zero shear stress connectors in rows mounted to the second side of said system board with said central area, and a plurality of cards having male zero shear stress connectors mating with said second plurality of female zero shear stress connectors, said cards having mounted thereon on two sides memory chip sites.

9. The multi-way central processing unit recited in claim 8 further comprising a plurality of integrated circuit chips mounted at said chip sites within said chip areas on said first and second sides of said ceramic substrate and a plurality of logic chips mounted at said chip sites within said central area of said first side of said system board.

10. The multi-way central processing unit recited in claim 7 wherein each of said replaceable central processor modules further comprises first and second cooling means respectively sealed to said first and second sides of said ceramic substrate for enclosing said chip areas thereof and cooling integrated circuit chips mounted at said integrated circuit chip sites.

11. A multi-way central processing unit comprising:

plural replaceable central processing unit modules and a system board having first and second sides each having a central area, each replaceable central processing unit module comprising:

a ceramic substrate having first and second sides, each of said first and second sides having a chip area and a connector area in registry, integrated circuit chip sites in rows within the chip areas on said first and second sides of said ceramic substrate, surface power bus means extending from one edge of said ceramic substrate to an opposite edge of said ceramic substrate and on at least one of said first and second sides thereof, said surface power bus means running between said rows of integrated circuit chip sites for uniformly distributing power to said integrated circuit chip sites, said surface power bus means comprises adjacent each row of chip sites a horizontal member comprising at least two voltage buses and a vertical member, said vertical member supporting said horizontal member above said ceramic substrate and conducting paths for current between said voltage buses and said integrated circuit chip sites, zero shear stress male connector on said first side of said ceramic substrate in said connector area said zero shear stress male connector adapted to mate with a zero shear stress female connector on a system board to which said replaceable central processing unit module is attached, and zero shear stress female connector on said second side of said ceramic substrate in said connector area, said zero shear stress female connector adapted to mate with a zero stress male connector on a cable, said system board having a first plurality of female zero shear stress connectors in rows on either side of said central area of said first and second sides, said zero shear stress male connectors of said replaceable central processing modules being inserted in at least some of said first plurality of female zero shear stress connectors on at least said first side of said system board.

12. The multi-way central processing unit recited in claim 11 wherein said zero stress female connectors comprise a second metallized ceramic having at least one hole extending from a first surface to an opposite second surface of said second metallized ceramic and through which a female connector spring projects extending beyond said first surface and being approximately flush with said second surface, said female connector pin being soldered within said hole, and a stiffener surrounding and attached to said second metallized ceramic, said stiffener supporting said metal flange of said zero shear stress male connector when said male connector is inserted with zero insertion force, said zero shear stress male connector pin being inserted into said female connector spring by sliding said metal flange on said stiffener.

13. A multi-way central processing unit comprising:

plural replaceable central processing unit modules and a system board having first and second sides each having a central area, each replaceable central processing unit module comprising:

a ceramic substrate having first and second sides, each of said first and second sides having a chip area and a connector area in registry.

integrated circuit chip sites in rows within the chip areas on said first and second sides of said ceramic substrate.

surface power bus means extending from one edge of said ceramic substrate to an opposite edge of said ceramic substrate and on at least one of said first and second sides thereof, said surface power bus means running between said rows of integrated circuit chip sites for uniformly distributing power to said integrated circuit chip sites.

zero shear stress male connector on said first side of said ceramic substrate in said connector area said zero shear stress male connector adapted to mate with a zero stress female connector on a system board to which said replaceable central processing unit module is attached, said zero stress male connector comprises a metallized ceramic having at least one hole extending from a first surface to an opposite second surface of said metallized ceramic and through which a male connector pin projects extending beyond said first surface and being approximately flush with said second surface, said male connector pin being soldered within said hole, and a metal flange surrounding and attached to said metallized ceramic, and zero shear stress female connector on said second side of said ceramic substrate in said connector area, said zero shear stress female connector adapted to mate with a zero stress male connector on a cable.

said system board having a first plurality of female zero shear stress connectors in rows on either side of said central area of said first and second sides, said zero shear stress male connectors of said replaceable central processing modules being inserted in at least some of said first plurality of female zero shear stress connectors on at least said first side of said system board.

* * * * *